United States Patent
Lee et al.

(10) Patent No.: US 9,469,090 B2
(45) Date of Patent: Oct. 18, 2016

(54) MANUFACTURING METHOD OF DISPLAY

(71) Applicant: Samsung Display Co., Ltd., Yongin, Gyeonggi-Do (KR)

(72) Inventors: Kyung-Su Lee, Yongin (KR); Jong-Hwan Kim, Yongin (KR); Yong-Youl Cho, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 121 days.

(21) Appl. No.: 13/804,514

(22) Filed: Mar. 14, 2013

(65) Prior Publication Data

US 2013/0333834 A1    Dec. 19, 2013

(30) Foreign Application Priority Data

Jun. 13, 2012    (KR) .......................... 10-2012-0063225

(51) Int. Cl.
   *B32B 37/12* (2006.01)
   *B32B 37/24* (2006.01)
   *B32B 38/00* (2006.01)

(52) U.S. Cl.
   CPC .......... *B32B 37/12* (2013.01); *B32B 2037/243* (2013.01); *B32B 2038/0076* (2013.01); *B32B 2457/20* (2013.01); *Y10T 156/10* (2015.01)

(58) Field of Classification Search
   CPC ...................................................... B32B 37/12
   USPC ..................................... 156/272.2, 275.5, 60
   See application file for complete search history.

(56) References Cited

U.S. PATENT DOCUMENTS

| | | | |
|---|---|---|---|
| 6,004,413 A * | 12/1999 | Couttenier | 156/99 |
| 2009/0218041 A1* | 9/2009 | Dean et al. | 156/305 |
| 2010/0277684 A1* | 11/2010 | Fukushima et al. | 349/158 |
| 2011/0177261 A1* | 7/2011 | Ishii et al. | 428/1.5 |
| 2012/0026102 A1* | 2/2012 | Chang et al. | 345/173 |
| 2013/0029075 A1* | 1/2013 | Niiyama et al. | 428/41.7 |

FOREIGN PATENT DOCUMENTS

| | | | | |
|---|---|---|---|---|
| JP | 2004-185827 A | 7/2004 | | |
| JP | 2005-332615 A | 12/2005 | | |
| JP | 4890582 B2 | 12/2011 | | |
| JP | 2012071281 A * | 4/2012 | | B05C 11/02 |
| KR | 10-2007-0002586 A | 1/2007 | | |
| KR | 10-2008-0088193 A | 10/2008 | | |
| KR | 10-1041616 B1 | 6/2011 | | |
| KR | 10-1056404 B1 | 8/2011 | | |
| KR | 10-2011-0124534 A | 11/2011 | | |
| KR | 10-2011-0135290 A | 12/2011 | | |
| KR | 10-1097519 B1 | 12/2011 | | |
| WO | WO 2011148990 A1 * | 12/2011 | | |

OTHER PUBLICATIONS

Korean Office Action dated Sep. 13, 2013 for Korean Patent Application No. KR 10-2012-0063225 which corresponds to captioned U.S. Appl. No. 13/804,514.

* cited by examiner

*Primary Examiner* — Daniel McNally
(74) *Attorney, Agent, or Firm* — Knobbe Martens Olson & Bear LLP

(57) ABSTRACT

In one aspect, a method of manufacturing a display device including: forming a preliminary resin layer of a liquid on the display panel; semi-hardening an edge of the preliminary resin layer; aligning a window on the preliminary resin layer; and fully hardening the entire preliminary resin layer to form a resin layer is provided.

14 Claims, 3 Drawing Sheets

MANUFACTURING METHOD OF DISPLAY

CROSS-REFERENCE TO RELATED APPLICATIONS

This application claims priority to and the benefit of Korean Patent Application No. 10-2012-0063225 filed in the Korean Intellectual Property Office on Jun. 13, 2012, the disclosure of which is incorporated herein by reference in its entirety.

BACKGROUND

1. Field

The present disclosure relates to a display device. More particularly, the present disclosure relates generally to a display device including a window.

2. Description of the Related Technology

A display device which displays an image may be a liquid crystal display, a plasma display panel, or an organic light emitting diode display in accordance with the type of a display panel included in the display device.

A conventional display device has a window on a display panel received in a receiving member to prevent interference to the display panel, and a resin layer may be disposed between the display panel and the window to attach the display panel and the window to each other.

In the conventional device, the resin layer may be disposed between the display panel and the window to attach the display panel and the window to each other, and then ultraviolet (UV) light may be irradiated to the resin layer through the window or irradiated between the display panel and the window from a side of the display device to harden the resin layer disposed between the display panel and the window.

The resin layer may use a liquid resin, however a problem exists in that the liquid may flow.

Accordingly, to limit movement of the liquid resin the liquid resin is coated to prevent the liquid resin from overflowing after a dam is formed on an edge of the panel.

However, when forming the dam, a process of forming the dam and a process of coating the liquid resin are respectively performed such that process time may be increased and a resin to form the dam and the liquid resin must be separately managed.

The above information disclosed in this Background section is only for enhancement of understanding of the background of the described technology and therefore it may contain information that does not form prior art that is already known to a person of ordinary skill in the art.

SUMMARY

Some embodiments provide a manufacturing method of a display device forming a resin layer by using a liquid resin without an additional dam.

Some embodiments provide a manufacturing method of a display device including: forming a preliminary resin layer of a liquid on the display panel; semi-hardening an edge of the preliminary resin layer; aligning a window on the preliminary resin layer; and fully hardening the entire preliminary resin layer to form a resin layer.

In certain embodiments, the preliminary resin layer may include a photo-hardening material.

In certain embodiments, the display panel may be a flexible substrate.

In certain embodiments, the window and the display panel may have an edge with a curved surface.

In certain embodiments, the semi-hardening may be performed by using a mask having a transmissive region corresponding to the edge for an exposure.

In certain embodiments, an exposure may be performed with a wavelength of 350 nm to 390 nm during a time of 5 seconds to 30 seconds for the semi-hardening. In certain embodiments, the exposure may be performed with a wavelength of 355 nm to 380 nm. In certain embodiments, the exposure may be performed with a wavelength of 360 nm to 370 nm. In certain embodiments, the exposure may be performed during a time of 5 seconds to 20 seconds for the semi-hardening. In certain embodiments, the exposure may be performed during a time of 5 seconds to 10 seconds for the semi-hardening.

In certain embodiments, the forming of the preliminary resin layer of the liquid on the display panel may be performed by coating a liquid resin by using a slit nozzle.

In certain embodiments, a dam is not separately formed such that the resin layer of the display device having the curved surface may be easily formed by forming the resin layer as disclosed and described herein. Accordingly, the display device manufacturing process may be simplified by following the methods as disclosed and described herein.

DESCRIPTION OF SYMBOLS

Figure 1:
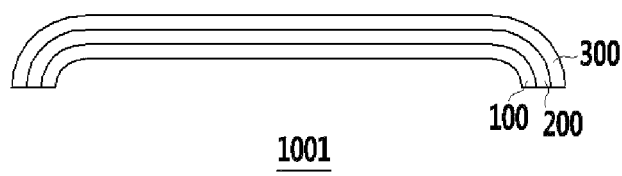
FIG. 1 is a schematic cross-sectional view of a display device according to an exemplary embodiment.

10: first arriving part
20: preliminary resin layer
30: slit nozzle
40: light source
50: second arriving part
100: display panel
200: resin layer
300: window

DETAILED DESCRIPTION

The present disclosure will be described more fully hereinafter with reference to the accompanying drawings, in which exemplary embodiments are shown. As those skilled in the art would realize, the described embodiments may be modified in various different ways, all without departing from the spirit or scope of this disclosure.

The drawings and description are to be regarded as illustrative in nature and not restrictive. Like reference numerals designate like elements throughout the specification. The size and thickness of the components shown the drawings are optionally determined for better understanding and ease of description, and the present embodiments are not limited to the examples shown in the drawings.

Throughout the specification, it will be understood that when an element such as a layer, film, region, area, or panel is referred to as being "on" another element, it can be directly on the other element or intervening elements may also be present. Also, when it is described that an element is "coupled" to another element, the element may be "directly coupled" to the other element or "electrically coupled" to the other element through a third element.

Next, a display device 1001 according to an exemplary embodiment will described with reference to FIG. 1.

FIG. 1 is a schematic cross-sectional view of a display device according to an exemplary embodiment.

As shown in FIG. 1, a display device 1001 according to an exemplary embodiment includes a display panel 100, a resin layer 200, and a window 300.

The display panel 100 may be a liquid crystal display panel including a window, or an organic light emitting panel including an organic light emitting element.

Also, the display panel 100 may be formed of a transparent substrate or a flexible substrate such as a polymer film.

In certain embodiments, the window 300 may be made of a transparent material such as glass or resin, thereby protecting the display panel 100 for the display panel 100 to not be damaged by an external impact.

In certain embodiments, the window 300 may be attached to the display panel 100 by the resin layer 200 positioned between the display panel 100 and the window 300, and the window may protect the display panel 100 along with the resin layer 200, thereby improving impact-resistance of the display device 1001.

In certain embodiments, the resin layer 200 of a transparent material may be positioned between the display panel 100 and the window 300 and may be formed to enclose the display panel, thereby preventing an air gap between a receiving member (not shown) receiving the display panel 100 from being formed and simultaneously preventing foreign particles such as a dust from existing between the display panel 100 and the window 300, and between the display panel 100 and the receiving member. In certain embodiments, the image displayed in the display panel 100 may be prevented from being distorted by an air gap or foreign particles between the display panel 100 and the window 300.

In certain embodiments, the resin layer 200 has a function of attaching the window 300 to the display panel 100, thereby improving the impact-resistance of the display device 1001 along with the window 300.

In certain embodiments, the resin layer 200 includes an ultraviolet (UV) hardening resin, thereby being made by photo-hardening.

Next, a manufacturing method of a display device according to an exemplary embodiment of FIG. 1 will be described with reference to FIG. 2 to FIG. 7.

Figure 2:
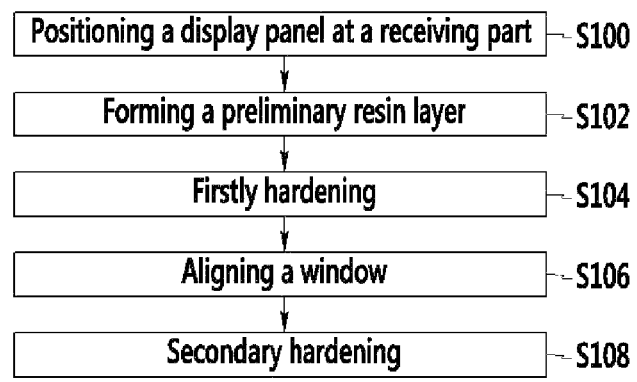
FIG. 2 is a flowchart of a manufacturing method of a display device according to an exemplary embodiment.

FIG. 2 is a flowchart of a manufacturing method of a display device according to an exemplary embodiment.

As shown in FIG. 2, the manufacturing method of the display device according to an exemplary embodiment includes positioning a display panel on the first arriving part S100, forming a preliminary resin layer on the display panel S102, performing first hardening S104, aligning a window on the preliminary resin layer S106, and performing secondary hardening S108.

Next, the manufacturing method of the display device according to the flowchart of FIG. 2 will be described along with cross-sectional views of FIG. 3 to FIG. 7.

FIG. 3 to FIG. 7 are views to explain a manufacturing method of a display device according to an exemplary embodiment.

Figure 3:
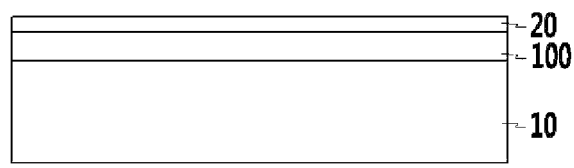
FIG. 3 to FIG. 7 are views to explain a manufacturing method of a display device according to an exemplary embodiment.

As shown in FIG. 2 and FIG. 3, the display panel 100 may be positioned on a first arriving part 10 (S100).

The first arriving part 10 provides a flat surface to support the display panel 100.

In certain embodiments, a liquid resin may be coated on the display panel 100 to form a preliminary resin layer 20 (S102). In certain embodiments, the preliminary resin layer 20 may be formed by coating the liquid resin on the entire surface of the display panel 100 by using a slit nozzle 30.

Figure 4:
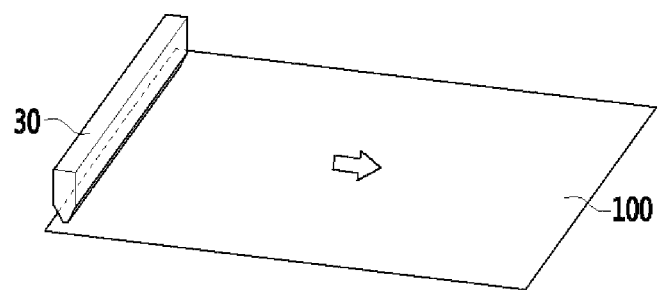

In certain embodiments, the slit nozzle 30 may have a substantially equivalent length to a longitudinal or transverse edge of the display panel 100, may be disposed to correspond to the display panel 100, and then progresses in one direction such as the arrow direction of FIG. 4.

Figure 5:
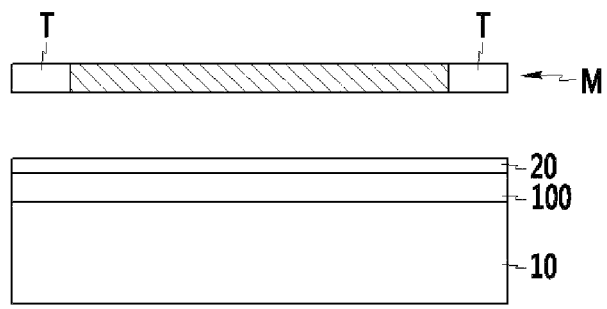

As shown in FIG. 2 and FIG. 5, a preliminary resin layer 20 may be initially hardened by using a mask M (S104). In certain embodiments, the mask may include a transmissive region T through which light is transmitted at the edge such that only the edge of the preliminary resin layer is hardened.

In certain embodiments, the light may come from an LED lamp, and the exposure may be performed with a wavelength of 350 nm to 390 nm during a time of 5 seconds to 30 seconds for semi-hardening.

Figure 6:
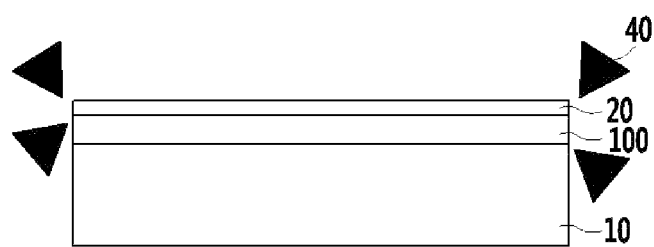

Also, for the semi-hardening, as shown in FIG. 6, to obliquely irradiate the light to the edge of the preliminary resin layer 20, the light may be irradiated after a light source 40 is disposed at a right-upper side, a right-lower side, a left-upper side, or a left-lower aide of the display panel 100.

Figure 7:
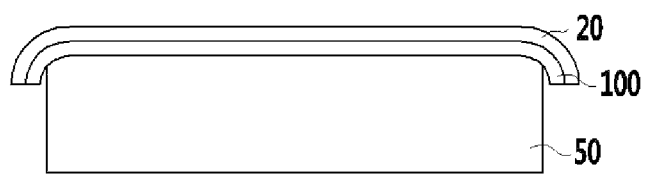

As shown in FIG. 2 and FIG. 7, the display panel 100 formed with the preliminary resin layer 20 may be positioned on a second arriving part 50.

In certain embodiments, the second arriving part 50 may provide the same upper surface as the shape of the window and a curved surface at the edge.

Accordingly, the edge of the display panel 100 may be curved according to the upper surface of the second arriving part 50.

In an exemplary embodiment, the second arriving part 50 may be moved after semi-hardening the edge such that a reduction of adherence of the resin layer due to a non-uniform thickness of the resin layer according to a wobble or an overflow of the preliminary resin layer 20 under the movement may be prevented.

In certain embodiments, the preliminary resin layer positioned at the curved surface may flow down while the window is attached if the display panel 100 may be positioned on the second arriving part 50 having the curved surface to manufacture the display device having the edge with the curved surface. In certain embodiments, the edge where the preliminary resin layer is semi-hardened forms a dam such that the preliminary resin layer of the liquid may be prevented from flowing even after time has passed if the display panel 100 is positioned at the second arriving part 50 after the semi-hardening.

Next, the window 300 may be aligned on the preliminary resin layer S106, and then secondary hardening may be performed S108 to form a resin layer 200. At this time, the exposure is performed for the entire surface of the display panel 100 such that the entire preliminary resin layer may be hardened.

In certain embodiments, a resin layer having a uniform thickness may be formed such that adherence between the display panel and the window may be increased and image distortion due to a refractive index difference may be decreased if the full hardening is performed after the semi-hardening of the edge of the preliminary resin layer.

While this disclosure has been described in connection with what is presently considered to be practical exemplary embodiments, it is to be understood that the embodiments are not limited to the practical exemplary embodiments, but, on the contrary, is intended to cover various modifications and equivalent arrangements included within the spirit and scope of the appended claims.

What is claimed is:

1. A method of manufacturing a display device comprising:
   forming a preliminary resin layer of a liquid on the display panel having a surface in a single depositing process that progresses in one direction along the surface of the display panel;
   semi-hardening an edge of the preliminary resin layer to provide a preliminary resin layer including a semi-hardened edge region after completing forming the preliminary resin layer; wherein an exposure is performed with a wavelength of 350 nm to 390 nm during a time of 5 seconds to 30 seconds for the semi-hardening, and wherein the semi-hardening is performed by using a mask having a transmissive region corresponding to the edge for exposure;
   aligning a window on the preliminary resin layer including the semi-hardened edge region, wherein the window and the display panel have an edge with a curved surface; and
   fully hardening the entire preliminary resin layer including the semi-hardened edge region to form a resin layer.

2. The method of claim 1, wherein the display panel has a convex face and a concave face and the window has a convex face and a concave face.

3. The method of claim 2, wherein the resin layer contacts the convex of the display panel and the resin layer contacts the concave face of the window.

4. The method of claim 3, wherein the exposure is performed with a wavelength of 355 nm to 380 nm.

5. The method of claim 3, wherein the exposure is performed with a wavelength of 360 nm to 370 nm.

6. The method of claim 3, wherein the exposure is performed during a time of 5 seconds to 20 seconds for the semi-hardening.

7. The method of claim 3, wherein the exposure is performed during a time of 5 seconds to 10 seconds for the semi-hardening.

8. The method of claim 1, wherein
   the preliminary resin layer includes a photo-hardening material.

9. The method of claim 1, wherein
   the display panel is a flexible substrate.

10. The method of claim 1, wherein
    the forming of the preliminary resin layer of the liquid on the display panel is performed by coating a liquid resin by using a slit nozzle.

11. The method of claim 1, wherein the exposure is performed with a wavelength of 355 nm to 380 nm.

12. The method of claim 1, wherein the exposure is performed with a wavelength of 360 nm to 370 nm.

13. The method of claim 1, wherein the exposure is performed during a time of 5 seconds to 20 seconds for the semi-hardening.

14. The method of claim 1, wherein the exposure is performed during a time of 5 seconds to 10 seconds for the semi-hardening.

* * * * *